United States Patent
Balmakhtar et al.

(10) Patent No.: US 12,541,659 B2
(45) Date of Patent: Feb. 3, 2026

(54) DIFFERENTIATED AND MODULATED SPECTRUM POWER RADIATION VIA MIMO AND BEAMFORMING IMPOSED UPON AMBIENT ELECTROMAGNETIC POWER HARVESTING CHIPS

(71) Applicant: T-Mobile Innovations LLC, Overland Park, KS (US)

(72) Inventors: Marouane Balmakhtar, Fairfax, VA (US); Robert Keith Butler, Overland Park, KS (US); Galip Murat Karabulut, Vienna, VA (US); Lyle W. Paczkowski, Mission Hills, KS (US)

(73) Assignee: T-Mobile Innovations LLC, Overland Park, KS (US)

( * ) Notice: Subject to any disclaimer, the term of this patent is extended or adjusted under 35 U.S.C. 154(b) by 192 days.

(21) Appl. No.: 18/295,075

(22) Filed: Apr. 3, 2023

(65) Prior Publication Data

US 2024/0330615 A1    Oct. 3, 2024

(51) Int. Cl.
*G06K 7/10*    (2006.01)

(52) U.S. Cl.
CPC ..... *G06K 7/10099* (2013.01); *G06K 7/10029* (2013.01)

(58) Field of Classification Search
CPC .............. G06K 7/10029; G06K 7/10099
See application file for complete search history.

(56) References Cited

U.S. PATENT DOCUMENTS

| | | | |
|---|---|---|---|
| 6,882,128 B1 | 4/2005 | Rahmel et al. | |
| 7,652,577 B1 * | 1/2010 | Madhow | G06K 7/10346 340/572.1 |
| 7,986,935 B1 | 7/2011 | D'Souza et al. | |
| 8,204,794 B1 | 6/2012 | Peng et al. | |

(Continued)

FOREIGN PATENT DOCUMENTS

| | | |
|---|---|---|
| EP | 2679503 A2 | 1/2014 |
| EP | 3875981 A2 | 9/2021 |

(Continued)

OTHER PUBLICATIONS

Notice of Allowance and Fee(s) dated Jul. 18, 2024, U.S. Appl. No. 17/161,415, filed Jan. 28, 2021.

(Continued)

*Primary Examiner* — Thomas D Alunkal

(57) ABSTRACT

A method of utilizing beamforming to selectively locate one or more ambient electromagnetic power harvesting (AEPH) chips, implemented by a reader apparatus comprising multiple antennas, the method comprises transmitting, to the AEPH chips, an interrogation signal from multiple transmit antennas by a reader application executing on a processor of the reader apparatus in a first frequency band to activate the AEPH chips; receiving, from at least one AEPH chip by multiple receive antennas of the reader apparatus, one or more signals in response to the interrogation signal; processing the one or more signals to determine a direction of the at least one AEPH chip; and adjusting, using a beamformer, a beam direction of the multiple transmit antennas of (Continued)

the reader apparatus in the direction of the at least one AEPH chip to deliver the maximum power to the at least one AEPH chip.

20 Claims, 5 Drawing Sheets

(56) References Cited

U.S. PATENT DOCUMENTS

| | | | |
|---|---|---|---|
| 8,593,256 B2 | 11/2013 | Isabell | |
| 8,680,971 B2* | 3/2014 | Ito | H01Q 1/2208 |
| | | | 340/602 |
| 8,960,543 B2* | 2/2015 | Roedig | G06K 7/0008 |
| | | | 235/451 |
| 9,256,881 B2 | 2/2016 | Engels et al. | |
| 9,411,992 B1 | 8/2016 | Marek et al. | |
| 9,894,471 B1 | 2/2018 | Zalewski et al. | |
| 10,676,240 B2 | 6/2020 | Logunov et al. | |
| 10,922,939 B1* | 2/2021 | Shakedd | G06K 7/10366 |
| 10,938,449 B1 | 3/2021 | Loman et al. | |
| 11,038,694 B1 | 6/2021 | Kleinman | |
| 11,213,773 B2 | 1/2022 | Okoro et al. | |
| 11,238,324 B1 | 2/2022 | Marquardt et al. | |
| 11,258,302 B1 | 2/2022 | Marquardt et al. | |
| 11,704,528 B2 | 7/2023 | Marquardt et al. | |
| 11,714,985 B1 | 8/2023 | Bales et al. | |
| 11,757,305 B2 | 9/2023 | Marquardt et al. | |
| 11,900,198 B2 | 2/2024 | Marquardt et al. | |
| 11,924,908 B1 | 3/2024 | Paczkowski et al. | |
| 11,946,766 B1 | 4/2024 | Volkerink et al. | |
| 12,073,417 B2 | 8/2024 | Chen | |
| 12,155,423 B1 | 11/2024 | Loman et al. | |
| 12,164,987 B2 | 12/2024 | Bales et al. | |
| 12,197,983 B2 | 1/2025 | Marquardt et al. | |
| 12,229,610 B2 | 2/2025 | Bales et al. | |
| 12,445,169 B2 | 10/2025 | Bales et al. | |
| 2004/0155778 A1 | 8/2004 | Shek et al. | |
| 2005/0151617 A1 | 7/2005 | Nakazawa | |
| 2006/0071925 A1 | 4/2006 | Wykoff et al. | |
| 2006/0134580 A1 | 6/2006 | Raby et al. | |
| 2007/0085688 A1 | 4/2007 | Zhu et al. | |
| 2007/0205902 A1 | 9/2007 | Cote et al. | |
| 2008/0018467 A1 | 1/2008 | Estevez et al. | |
| 2008/0122631 A1 | 5/2008 | Kodukula et al. | |
| 2008/0126111 A1 | 5/2008 | Loda | |
| 2008/0129457 A1 | 6/2008 | Ritter et al. | |
| 2009/0096574 A1 | 4/2009 | Oberle | |
| 2009/0315686 A1 | 12/2009 | Oberle | |
| 2010/0090004 A1 | 4/2010 | Sands et al. | |
| 2010/0102123 A1 | 4/2010 | Skowronek | |
| 2011/0181399 A1 | 7/2011 | Pollack et al. | |
| 2011/0273273 A1 | 11/2011 | Liu | |
| 2012/0018505 A1 | 1/2012 | Jiang et al. | |
| 2012/0105210 A1 | 5/2012 | Smith et al. | |
| 2012/0126945 A1 | 5/2012 | Kim et al. | |
| 2012/0149300 A1 | 6/2012 | Forster | |
| 2013/0084796 A1 | 4/2013 | Kerr | |
| 2013/0320079 A1 | 12/2013 | Nordin et al. | |
| 2014/0134468 A1 | 5/2014 | Schaefer et al. | |
| 2015/0048682 A1 | 2/2015 | Murley | |
| 2015/0069126 A1 | 3/2015 | Leon | |
| 2017/0093896 A1 | 3/2017 | Poornachandran et al. | |
| 2017/0270323 A1 | 9/2017 | Butler et al. | |
| 2017/0364720 A1 | 12/2017 | Kantor et al. | |
| 2019/0034672 A1 | 1/2019 | Rokhsaz | |
| 2019/0121576 A1 | 4/2019 | Jean | |
| 2019/0138870 A1 | 5/2019 | Kuzbari et al. | |
| 2019/0149725 A1 | 5/2019 | Adato et al. | |
| 2019/0285724 A1 | 9/2019 | Meadow | |
| 2019/0347454 A1 | 11/2019 | Mongrenier et al. | |
| 2019/0354824 A1 | 11/2019 | Mohiuddin et al. | |
| 2020/0004999 A1 | 1/2020 | Kawaguchi et al. | |
| 2020/0180935 A1 | 6/2020 | Zumtobel et al. | |
| 2020/0219112 A1 | 7/2020 | Nakayma et al. | |
| 2020/0227813 A1 | 7/2020 | Yehezkely | |
| 2020/0265446 A1 | 8/2020 | Vargas | |
| 2021/0019482 A1 | 1/2021 | Shakedd et al. | |
| 2021/0019585 A1 | 1/2021 | Shakedd et al. | |
| 2021/0027587 A1 | 1/2021 | Yeh et al. | |
| 2021/0126623 A1* | 4/2021 | Jeong | H05K 1/0218 |
| 2021/0142013 A1* | 5/2021 | Kumar | G06K 7/10158 |
| 2021/0203496 A1 | 7/2021 | Cariello et al. | |
| 2021/0219102 A1 | 7/2021 | Gion et al. | |
| 2021/0224727 A1 | 7/2021 | Rakhunde et al. | |
| 2021/0280307 A1 | 9/2021 | Hargrove et al. | |
| 2021/0342559 A1 | 11/2021 | Frederick | |
| 2022/0043990 A1* | 2/2022 | Pandey | G06K 19/0723 |
| 2022/0109667 A1 | 4/2022 | Gorog | |
| 2022/0121894 A1 | 4/2022 | Marquardt et al. | |
| 2022/0171051 A1 | 6/2022 | Cristache et al. | |
| 2022/0180141 A1 | 6/2022 | Marquardt et al. | |
| 2022/0331841 A1 | 10/2022 | Filler et al. | |
| 2022/0344971 A1 | 10/2022 | Marquardt et al. | |
| 2022/0374030 A1 | 11/2022 | Lehtonen et al. | |
| 2022/0374621 A1* | 11/2022 | Biswas | G06K 7/10297 |
| 2023/0140778 A1* | 5/2023 | Abotabl | H04W 52/0216 |
| | | | 370/311 |
| 2023/0187811 A1 | 6/2023 | Cohen et al. | |
| 2023/0306224 A1 | 9/2023 | Marquardt et al. | |
| 2023/0351406 A1 | 11/2023 | Marquardt et al. | |
| 2024/0015661 A1* | 1/2024 | Wang | H04B 7/15528 |
| 2024/0020502 A1 | 1/2024 | Marquardt et al. | |
| 2024/0047993 A1 | 2/2024 | Paczkowski et al. | |
| 2024/0047994 A1 | 2/2024 | Paczkowski et al. | |
| 2024/0088957 A1* | 3/2024 | Wang | G06K 19/0723 |
| 2024/0127022 A1 | 4/2024 | Marquardt et al. | |
| 2024/0265226 A1 | 8/2024 | Bales et al. | |
| 2024/0273313 A1* | 8/2024 | Wang | G06K 7/10029 |
| 2024/0339867 A1 | 10/2024 | Balmakhtar et al. | |
| 2024/0364145 A1 | 10/2024 | Balmakhtar et al. | |
| 2024/0394723 A1 | 11/2024 | Chen | |
| 2024/0405803 A1 | 12/2024 | Bales et al. | |
| 2025/0053769 A1 | 2/2025 | Bales et al. | |
| 2025/0094757 A1 | 3/2025 | Marquardt et al. | |
| 2025/0148249 A1 | 5/2025 | Bales et al. | |

FOREIGN PATENT DOCUMENTS

| | | | |
|---|---|---|---|
| EP | 4172863 A1 | 5/2023 | |
| EP | 4205031 A1 | 7/2023 | |
| EP | 4278425 A1 | 11/2023 | |
| EP | 4429076 A1 | 9/2024 | |
| EP | 4443327 A1 | 10/2024 | |
| EP | 4446939 A1 | 10/2024 | |
| EP | 4455934 A1 | 10/2024 | |
| EP | 4471660 A1 | 12/2024 | |
| EP | 4519805 | 3/2025 | |
| EP | 4537240 | 4/2025 | |
| WO | 2008051598 A1 | 5/2008 | |
| WO | 2008055212 A2 | 5/2008 | |
| WO | 20110160007 A2 | 12/2011 | |
| WO | 2015187199 A1 | 12/2015 | |
| WO | 2018063449 A1 | 4/2018 | |
| WO | 2018132120 A1 | 7/2018 | |
| WO | 20190149341 A1 | 8/2019 | |
| WO | 20200208412 A1 | 10/2020 | |
| WO | 2022060475 A1 | 3/2022 | |
| WO | 2022125162 A1 | 6/2022 | |
| WO | 2022231682 A1 | 11/2022 | |
| WO | 20220268331 A1 | 12/2022 | |
| WO | 20240167584 A1 | 8/2024 | |

OTHER PUBLICATIONS

Notice of Allowance dated Jul. 30, 2024, U.S. Appl. No. 18/332,284, filed Jun. 9, 2023.
Chen, Zhisheng, "Anti-counterfeiting System for Bottled Products," filed Jul. 12, 2024, U.S. Appl. No. 18/772,096.
Foreign Communication From a Related Counterpart Application, EP Extended Search Report and EP Search Opinion dated Aug. 16, 2024, EP Application No. 24165554.7.

(56) References Cited

OTHER PUBLICATIONS

Foreign Communication From a Related Counterpart Application, EP Extended Search Report and EP Search Opinion dated Sep. 2, 2024, EP Application No. 24165153.8.
Foreign Communication From a Related Counterpart Application, EP Extended Search Report and EP Search Opinion dated Sep. 18, 2024, EP Application No. 24169545.1.
Foreign Communication From a Related Counterpart Application, EP Extended Search Report and EP Search Opinion dated Oct. 15, 2024, EP Application No. 24175267.4.
Bales, Mark R., et al., "System and Method of Controlling Unique Identities of Ambient Electromagnetic Power Harvesting Chips," filed Oct. 28, 2024, U.S. Appl. No. 18/929,569.
Balmakhtar, Marouane, et al., "Location Detection and Tracking Using Ambient Electromagnetic Power Harvesting," filed Apr. 25, 2023, U.S. Appl. No. 18/306,934.
Office Action dated Sep. 14, 2023, U.S. Appl. No. 17/161,415, filed Jan. 28, 2021.
Notice of Allowance dated Sep. 27, 2023, U.S. Appl. No. 17/115,596, filed Dec. 8, 2020.
Foreign Communication From a Related Counterpart Application, International Search Report and Written Opinion dated Sep. 26, 2023, International Application No. PCT/US2023/067789.
Marquardt, Ronald, R., et al., "RFID Device with Two-Stage Power Harvesting," filed May 24, 2023, U.S. Appl. No. 18/323,268.
"Bales, Mark, R., et al., ""Ambient Electromagnetic Power Harvesting Device for Collecting and Forwarding Data,"" filed May 30, 2023, U.S. Appl. No. 18/325,936."
Office Action dated Oct. 17, 2023, U.S. Appl. No. 17/165,877, filed Feb. 7, 2023.
Marquardt, Ronald, R., et al., "Multi-tier Identities in an RFID Chip," filed Dec. 20, 2023, U.S. Appl. No. 18/325,936.
Office Action dated Apr. 30, 2020, U.S. Appl. No. 16/158,299, filed Oct. 12, 2018.
Notice of Allowance dated Oct. 30, 2020, U.S. Appl. No. 16/158,299, filed Oct. 12, 2018.
Notice of Allowance dated Oct. 5, 2021, U.S. Appl. No. 17/024,484, filed Sep. 17, 2020.
Notice of Allowance dated Oct. 21, 2021, U.S. Appl. No. 17/240,846, filed Apr. 26, 2021.
Notice of Allowance dated Mar. 7, 2023, U.S. Appl. No. 17/568,019, filed Jan. 4, 2022.
Notice of Allowance dated May 3, 2023, U.S. Appl. No. 17/867,218, filed Jul. 18, 2022.
Office Action dated May 11, 2023, U.S. Appl. No. 17/161,415, filed Jan. 28, 2021.
Office Action dated Jun. 20, 2023, U.S. Appl. No. 17/115,596, filed Dec. 8, 2020.
Notice of Allowance dated May 11, 2023, U.S. Appl. No. 17/571,294, filed Jan. 7, 2022.
Foreign Communication From a Related Counterpart Application, International Search Report and Written Opinion dated Nov. 23, 2021, International Application No. PCT/US2021/044086 filed on Jul. 31, 2021.
Foreign Communication From a Related Counterpart Application, International Search Report and Written Opinion dated Dec. 6, 2021, International Application No. PCT/US2021/051159 filed on Sep. 20, 2021.
Foreign Communication From a Related Counterpart Application, Invitiation to Pay Additional Fees dated May 30, 2022, International Application No. PCT/US2022/017304.
Foreign Communication From a Related Counterpart Application, International Search Report and Written Opinion dated Jul. 21, 2022, International Application No. PCT/US2022/017304.
Foreign Communication From a Related Counterpart Application, International Search Report and Written Opinion dated May 3, 2023, International Application No. PCT/US2023/014517.
Loman, Clinton H., et al., "Battery Coupled Radio Frequency Identity (RFID)," filed Jan. 28, 2021, U.S. Appl. No. 17/161,415.
Marquardt, Ronald, R., et al., "Multi-tier Identities in an RFID Chip," filed Dec. 8, 2020, U.S. Appl. No. 17/115,596.
Marquardt, Ronald, R., et al., "RFID Device with Two-Stage Power Harvesting," filed Jul. 31, 2021, International Application No. PCT/US2021/044086.
Marquardt, Ronald, R., et al., "Multi-tier Identities in an RFID Chip," filed Sep. 20, 2021, International Application No. PCT/US2021/051159.
Marquardt, Ronald, R., et al., "Ambient Electromagnetic Power Harvesting Chip Adaptation Based on Available Power Level," filed Jan. 7, 2022, U.S. Appl. No. 17/571,294.
Marquardt, Ronald, R., et al., "Ambient Electromagnetic Power Harvesting Chip Adaptation Based on Available Power Level," filed Feb. 22, 2022, International Application No. PCT/US2022/017304.
Bales, Mark, R., et al., "System and Method of Controlling Unique Identities of Ambient Electromagnetic Power Harvesting Chips," filed Jul. 18, 2022, U.S. Appl. No. 17/867,218.
Bales, Mark, R., et al., "System and Method of Controlling Lifecycles of Ambient Electromagnetic Power Harvesting Chips," filed Feb. 7, 2023, U.S. Appl. No. 18/165,877.
Bales, Mark, R., et al., "System and Method of Controlling Unique Identities of Ambient Electromagnetic Power Harvesting Chips," filed Jun. 1, 2023, International Application No. PCT/US2023/067789.
Bales, Mark, R., et al., "System and Method of Controlling Unique Identities of Ambient Electromagnetic Power Harvesting Chips," filed Jun. 9, 2023, U.S. Appl. No. 18/332,284.
Chen, Zhisheng, "Anti-counterfeiting System for Bottled Products," filed May 2, 2022, U.S. Appl. No. 17/734,555.
Chen, Zhisheng, "Anti-counterfeiting System for Bottled Products," filed Mar. 3, 2023, International Application No. PCT/US2023/014517.
Balmakhtar, Marouane, et al., "Device and Method for Controlling a Physical Indicator of an Ambient Electromagnetic Power Harvesting Device," filed Apr. 10, 2023, U.S. Appl. No. 18/298,253.
Office Action dated Jan. 8, 2024, U.S. Appl. No. 17/734,555, filed May 2, 2022.
Final Office Action dated Apr. 1, 2024, U.S. Appl. No. 17/161,415, filed Jan. 28, 2021.
Office Action dated Apr. 8, 2024, U.S. Appl. No. 17/165,877, filed Feb. 7, 2023.
Tahir, M., et al. "An Approach for Managing Manufacturing Assets through Radio Frequency Energy Harvesting". Future and Automation Systems and Technologies Laboratory, Jan. 2019.
Notice of Allowance dated Apr. 19, 2024, U.S. Appl. No. 17/734,555, filed May 2, 2022.
Marquardt, Ronald, R., et al., "RFID Device with Two-Stage Power Harvesting," filed Dec. 3, 2024 U.S. Appl. No. 18/967,600.
Bales, Mark, R., et al., "System and Method of Controlling Lifecycles of Ambient Electromagnetic Power Harvesting Chips," filed Jan. 10, 2025, U.S. Appl. No. 19/017,214.
Notice of Allowance dated Oct. 15, 2024, U.S. Appl. No. 17/165,877, filed Feb. 7, 2023.
Notice of Allowance dated Sep. 13, 2024, U.S. Appl. No. 18/323,268, filed May 24, 2023.
Notice of Allowance dated Jun. 18, 2025, U.S. Appl. No. 18/325,936, filed May 30, 2023.
Office Action dated Jun. 30, 2025, U.S. Appl. No. 18/306,934, filed Apr. 25, 2023.
Ponnimbaduge, T.D., et al. "Simultaneous Wireless Information and Power Transfer (SWIPT): Recent Advances and Future Challenges." IEEE Communications Surveys & Tutorials, vol. 20, No. 1, pp. 264-302, 2018.
Notice of Allowance dated Aug. 22, 2025, U.S. Appl. No. 18/772,096, filed Jul. 12, 2024.
Office Action dated Oct. 16, 2025, U.S. Appl. No. 18/391,627, filed Dec. 20, 2023.

* cited by examiner

DIFFERENTIATED AND MODULATED SPECTRUM POWER RADIATION VIA MIMO AND BEAMFORMING IMPOSED UPON AMBIENT ELECTROMAGNETIC POWER HARVESTING CHIPS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Radio frequency identity (RFID) chips conventionally are divided into passive RFIDs and active RFIDs. Active RFIDs have their own autonomous power supply, such as a battery. Passive RFIDs harvest electric power from ambient electromagnetic waves, for example electromagnetic waves emitted by a proximate reader or a scanner device. In conventional systems, the proximate reader and the RFID chips are generally required to be in close proximity such that the RFID chips can operate in close proximity to the reader antenna. These systems limit transmission distance to cover large areas in inventory control systems and in other applications.

SUMMARY

In an embodiment, a method of utilizing beamforming to selectively locate one or more ambient electromagnetic power harvesting (AEPH) chips, implemented by a reader apparatus comprising multiple antennas is disclosed. The method comprises transmitting, to the AEPH chips, an interrogation signal from multiple transmit antennas by a reader application executing on a processor of the reader apparatus in a first frequency band to activate the AEPH chips; receiving, from at least one AEPH chip by multiple receive antennas of the reader apparatus, one or more signals in response to the interrogation signal; processing the one or more signals to determine a direction of the at least one AEPH chip; and adjusting, using a beamformer, a beam direction of the multiple transmit antennas of the reader apparatus in the direction of the at least one AEPH chip to deliver the maximum power to the at least one AEPH chip. In an embodiment, the method further comprises adjusting a transmission power parameter of the reader apparatus based on a distance between the at least one AEPH chip and the reader apparatus. In an embodiment, the method further comprises determining a phase shift for the one or more signals; and determining the direction of the at least one AEPH chip based on the phase shift. In an embodiment, the method further comprises monitoring a received signal strength indication (RSSI) value for the at least one AEPH chip to calculate a distance between the reader apparatus and the at least one AEPH chip and to maximize the power to the at least one AEPH chip based on the distance. In an embodiment, the method further comprises determining an angle of arrival of the one or more signals; and determining the direction of the at least one AEPH chip based on the angle of arrival. In an embodiment, the method further comprises determining differences in arrival times at which the one or more signals are received; and determining the direction of the at least one AEPH chip based on the differences in the arrival times. In an embodiment, the method further comprises receiving, from a group of AEPH chips by the multiple receive antennas, the one or more signals in response to the interrogation signal; processing the one or more signals to determine a direction of the group of AEPH chips; and adjusting, using the beamformer, the beam direction of the multiple transmit antennas of the reader apparatus in the direction of the group of AEPH chips to deliver the maximum power to the group of AEPH chips. In an embodiment, the multiple antennas comprise multiple input multiple output (MIMO) antennas. In an embodiment, the first frequency band comprises a 2.496 GHz to 2.502 GHz frequency band. In an embodiment, the first frequency band operates at a frequency of 2.496 GHz. In an embodiment, the AEPH chips receive power from ambient electromagnetic waves. In an embodiment, the AEPH chips receive power from ambient electromagnetic waves emitted in a cellular radio frequency band. In an embodiment, the interrogation signal comprises a first unique identifier identifying the at least one AEPH chip or a group of AEPH chips comprising the first unique identifier, wherein the unique identifier is established by an original equipment manufacturer (OEM). In an embodiment, the at least one AEPH chip comprises a memory for storing the first unique identifier in a first part of the memory and re-writeable identifier in a second part of the memory. In an embodiment, the re-writeable identifier can be accessed, renamed, or modified by the reader apparatus. In an embodiment, the reader apparatus comprises a handheld device, a static device, or a power transmitter. In an embodiment, the at least one AEPH chip is in line-of-sight or out-of-sight with the reader apparatus.

In another embodiment, a reader apparatus is disclosed. The reader apparatus comprises a processor, a non-transitory memory, a plurality of multiple input multiple output (MIMO) antennas coupled to the processor, a beamformer; and a reader application stored in the non-transitory memory. When executed by the processor, the reader application transmits, to one or more ambient electromagnetic power harvesting (AEPH) chips, an interrogation signal from multiple transmit MIMO antennas in a first frequency band to activate the AEPH chips; receives, from at least one AEPH chip by multiple receive MIMO antennas, one or more signals in response to the interrogation signal; processes the one or more signals to determine a direction of the at least one AEPH chip; and adjusts, using the beamformer, a beam direction of the multiple transmit antennas of the reader apparatus in the direction of the at least one AEPH chip to deliver the maximum power to the at least one AEPH chip.

In yet another embodiment, a method of communicating concurrently with one or more ambient electromagnetic power harvesting (AEPH) chips, implemented by a reader apparatus comprising multiple input multiple output (MIMO) antennas, the method comprises transmitting, to a first AEPH chip, a first interrogation signal from a first MIMO transmit antenna by a reader application executing on a processor of the reader apparatus in a first frequency band to activate the first AEPH chip; receiving, from the first AEPH chip, a first signal by a first receive antenna in response to the first interrogation signal; and transmitting, to a second AEPH chip, a second interrogation signal from a second MIMO transmit antenna of the reader apparatus, wherein transmitting the second interrogation signal is concurrent to receiving the first signal or transmitting the first interrogation signal.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
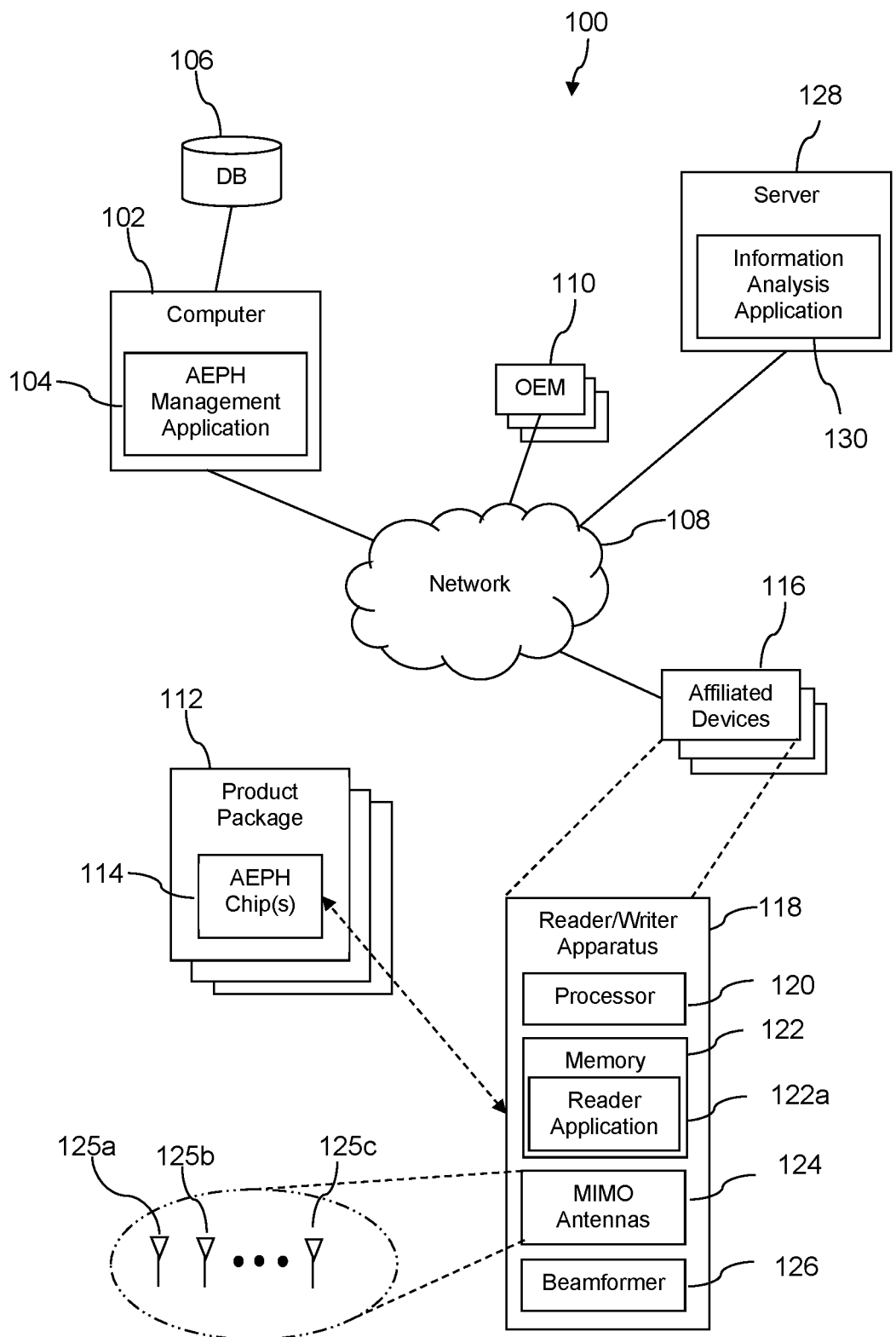
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure teaches a system and method for selectively locating one or more ambient electromagnetic power harvesting (AEPH) chips (that may be attached to individual instances of products) by a reader/writer apparatus by utilizing beamforming and multiple-input multiple-output (MIMO) technologies. The integration of disclosed beamforming and MIMO technologies may support macro spectrum band of frequencies and involve radiating electromagnetic energy in frequency ranges outside the customary RFID frequencies, for example radiating the electromagnetic energy in frequency ranging from 2.496 GHz to 2.502 GHz The disclosed beamforming and MIMO technologies may be employed to identify and localize a specific AEPH chip or a group of AEPH chips in various fields such as logistic, automotive, surveillance, automation systems, inventory control, etc. The integration of these technologies may provide dramatically increased ranges of operation, reliability, and throughput while maintaining currently accepted signal power requirements.

In conventional technologies, in an application scenario, there are often two or more chips within the scope of the reader apparatus. When the reader apparatus sends interrogation signals to these AEPH chips at the same time, the response from multiple chips may be mixed together, causing the reader apparatus to be unable to distinguish them and creating a conflict between the chips. Thus, the disclosed beamforming and MIMO technologies may be utilized to adjust a transmit power parameter, change the main beam direction of the MIMO antennas, and focus a transmitted beam with maximum power to a desired direction in a given geographic area to identify a group of AEPH chips or a particular AEPH chip. This beamforming and differentiated and modulated power radiation may provide accurate tracking, identification, and localization, and decrease the collisions and interference between the signals received from the responding chips.

In an embodiment, MIMO antennas/MIMO radio transceivers implemented on the reader apparatus may support multiple frequency bands and communicate concurrently with one or more ambient electromagnetic power harvesting (AEPH) chips by processing multiple signals for concurrent transmission via multiple antennas and supporting receive processing of multiple signals detected by the multiple antennas. The multiple transmit and receive paths are particularly useful to support beamforming to increase the directivity of emitted radio waves in a particular direction and to compensate for the loss of radio transmission.

Because some chips may be positioned behind obstructions and not wake up to announce their presence when the power beam is transmitted, the reader apparatus may scan the area multiple times using multiple antennas that would have the advantage of being able to "look around" the obstructions and identify the AEPH chips at unknown locations over the given geographic area. Thus, MIMO antennas implemented at the reader apparatus may improve the reader performance and identify line-of-sight (LoS) or Non-line-of-sight (NLoS) AEPH chips.

Multiple transmit antennas may transmit interrogation signals by a reader application executing on a processor of the reader apparatus to activate/wake-up one or more AEPH chips and multiple receive antennas may receive response signals from the one or more AEPH chips in response to the interrogation signals. To localize a group of AEPH chips or a particular AEPH chip, the reader/writer apparatus may measure a received signal strength indication (RSSI) value from the received response signals from the one or more AEPH chips and infer the distance between the one or more AEPH chips and itself (or alternatively infer the RF environment) based on the measured signal strength. The reader/writer apparatus may use this information to adapt an antenna or antennas to use beam forming techniques to maximize the power i.e. to focus the beam narrowly towards an identified location of a group of AEPH chips or a particular AEPH chip based on the distance.

In an embodiment, to localize a group of AEPH chips or a particular AEPH chip, the reader/writer apparatus may process one or more response signals from AEPH chips to determine a phase shift/difference between the signals received therefrom and to derive information from the one or more AEPH chips from a combination of the processed received signals.

The AEPH chips may be attached to individual instances of products with unique identifiers to identify the products and manage information about the lifecycle of the products and/or containers holding the products. While typically unique identifiers stored in AEPH chips are established by an original equipment manufacturer (OEM) of the AEPH chip who programs an identity into the AEPH chip during manufacture, the present disclosure teaches an independent AEPH identity management service that can store static information in one part of the chip and store dynamically writeable information in a different part of the chip. Once identified, a group of AEPH chips or a particular AEPH chip may be accessed, modified, or renamed to provide distinct identities to the identified chips.

Like RFID chips, the AEPH chips taught herein harvests ambient electromagnetic power to enable them to operate. A conventional RFID chip operates by broadcasting its unique identity and possibly additional statically defined information. Unlike the conventional RFID chip, the AEPH chip taught herein provides power management to perform different operations when exposed to different levels of available ambient electromagnetic power. For example, when exposed to ambient electromagnetic field of high-intensity, the AEPH chip can write information to memory that would otherwise consume more power than can be harvested from an ambient electromagnetic power field of low intensity. The AEPH chip may write and refresh dynamic random-access memory (DRAM) within the AEPH chip that consumes electrical energy at a relatively high rate. In one embodiment, the AEPH chip may receive more power using disclosed beamforming network and MIMO antennas. The beamforming network may focus the power of the multiple transmit antennas of a reader/writer apparatus in the direction of a specific AEPH chip to deliver the maximum power to the specific chip to perform different operations.

Turning now to FIG. 1, a system 100 is described. In an embodiment, system 100 comprises a computer 102 that executes an AEPH management application 104. Computers and computer systems are discussed further hereinafter. The computer 102 communicates with a datastore 106 that stores information about AEPH identities and event histories about the identities. While the computer 102 and the data store 106 are illustrated in FIG. 1 as communicating directly, in an embodiment, the computer 102 communicates with the data store 106 via a network 108. The network 108 comprises one or more private networks, one or more public networks, or a combination thereof.

The AEPH management application 104 establishes, allocates, and manages unique identities for AEPH chips 114. Like an RFID chip, the AEPH chip taught herein harvests ambient electromagnetic power to enable it to operate. The system 100 further comprises one or more product packages 112 each having one or more AEPH chips 114 manufactured by the OEM 110 affixed to the product package 112. Authorized users of the AEPH management service provided by the AEPH management application 104 may have affiliated devices 116 that comprise a reader/writer apparatus 118 or a power transmitter. The reader/writer apparatus 118 may be a static device permanently fixed to a surface, a handheld device, or a vehicle mounted device.

The reader/writer apparatus 118 may communicate with AEPH chip(s) 114 using a radio frequency allocated for cellular communication, for example a cellular radio frequency in the 2.4 GHz to 2.6 GHz frequency range. In an embodiment, the AEPH chip 114 may harvest electromagnetic energy from a cellular radio frequency band, for example from a cellular radio frequency in the 2.4 GHz to 2.6 GHz frequency range. In an embodiment, the AEPH chip(s) 114 may harvest electromagnetic energy from a radio frequency band of 2.496 GHz to 2.502 GHz. The reader/writer apparatus 118 may comprise a processor 120 (which may be referred to as a central processor unit or CPU) that is in communication with a memory device 122. The memory device 122 may store a reader application 122a to be executed on the processor 120.

The reader/writer apparatus 118 may further comprise MIMO antennas 124 and a beamformer 126. While three antennas (125a, 125b, 125c) are illustrated in FIG. 1, the MIMO antennas may comprise 2 antennas, 4 antennas, or more than 4 antennas. In some embodiments, the system 100 may further comprise an antenna feed controller that adapts the radio frequency signals input to the MIMO antennas 124 from the reader/writer apparatus 118 and the radio frequency signals received from the MIMO antennas 124. This operation may be performed by a radio transceiver of the reader/writer apparatus 118.

The reader/writer apparatus 118 may transmit an interrogation signal from multiple transmit antennas by the reader application 122a executing on the processor 120 in a first frequency band to activate/wake-up the AEPH chips 114. In response to the interrogation signal, at least one of the AEPH chips 114 or a group of the AEPH chips 114 may send one or more response signals to multiple receive antennas of the reader/writer apparatus 118 using the power received from the interrogation signal. The processor 120 may process the received one or more signals to determine a direction, location, or orientation of the at least one AEPH chip 114. The reader/writer apparatus 118 may employ the beamformer 126 to apply beamforming to adjust a beam direction of the multiple transmit antennas of the reader/writer apparatus 118 in the direction of the at least one AEPH chip to deliver the maximum power to the at least one AEPH chip. The beamformer 126 may adjust a transmission power parameter of the reader apparatus 118 based on a distance between the at least one AEPH chip 114 and the reader apparatus 118. This beamforming and differentiated and modulated power radiation may provide accurate localization and decrease the collisions and interference between the signals received from the responding chips.

The processor 120 may process the received one or more response signals to determine a phase shift, an angle of arrival, a direction of arrival, a time of arrival, or a received signal strength indication (RSSI) value between the signals received therefrom and deriving information from the one or more AEPH chips 114 from a combination of the processed received signals. Processing the received one or more signals may comprise determining a phase shift for the one or more signals from a particular AEPH chip 114 at multiple receive antennas to estimate a location of the particular AEPH chip. The processor 120 may further monitor a received signal strength indication (RSSI) value for the at least one AEPH chip 114 to calculate a distance between the reader apparatus 118 and the at least one AEPH chip 114 and to maximize the power to the at least one AEPH chip 114 based on the distance. The processor 120 may process the received one or more signals to determine an angle of arrival (AoA) or time of arrival (ToA) of the one or more signals and determine the direction of the at least one AEPH chip 114 based on the angle of arrival.

In an embodiment, the processor may further monitor received total wideband power (RTWP) along with RSSI for each antenna of the MIMO antennas 124 as a function of time, or the difference in power received among different antennas to determine external interference. The RTWP measurements may include counters for key performance indicator (KPI) such as physical resource blocks (PBR's).

The reader/writer apparatus 118 is communicatively coupled to the network 108 and transmits the information received from the AEPH chip(s) 114 via the network 108 to the data store 106. The reader/writer apparatus 118 may be communicatively coupled to the network 108 by a wired link or by a wireless link, for example via a cell site. The system 100 may further comprises a server 128 that executes an information analysis application 130 that accesses the information stored in the data store 106 by the reader/writer apparatus 118 and analyzes that information. The information analysis application 130 can support a plurality of different use cases. The server 128 may be implemented as a computer system.

In a first use case, the reader/writer apparatus 118 may provide an inventory management function by scanning all of the items/products (there may be a large number of items such as 50,000 items with AEPH chips) in a given geographical area of a distribution center by sweeping the power beam around the area using MIMO antennas 124. The reader/writer device 118 may further use beamforming techniques to transmit a focused beam to an identified location of a group of chips or a particular chip to cause the AEPH chip(s) to wake up and respond. This beamforming and differentiated and modulated power radiation may provide accurate localization and decrease the collisions and interference between the signals received from the responding chips.

In a second use case, the reader/writer device 118 may further use beamforming techniques to transmit a focused beam to a group of chips or a particular chip to provide distinct identities to AEPH chips. For example, a retail business may request distinct identity to an AEPH chip affixed to a particular model of a mobile communication device. For example, a recycling center may request distinct identity to AEPH chips affixed to receiving and recycling product containers.

Figure 2:
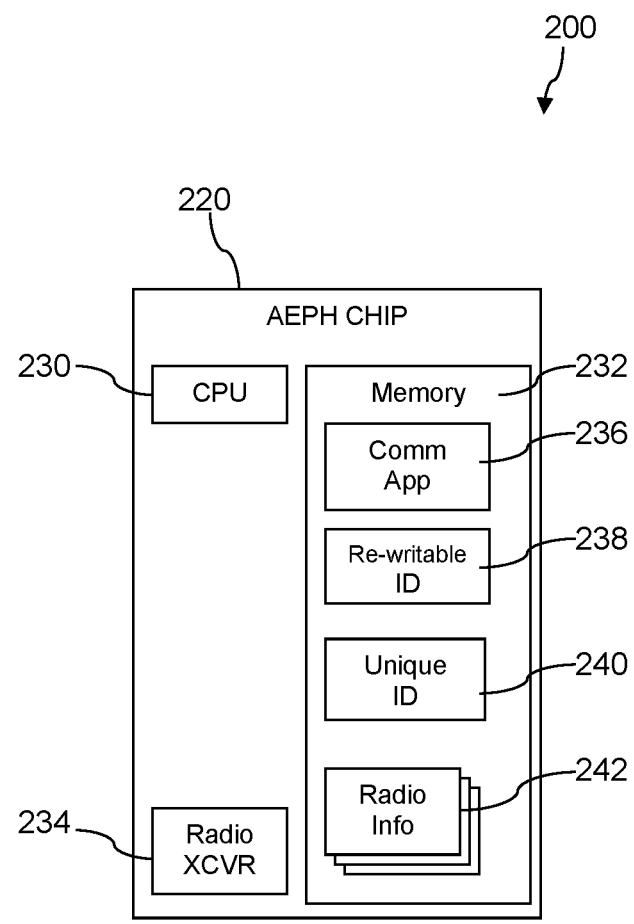
FIG. 2 is a block diagram of an ambient electromagnetic power harvesting (AEPH) chip according to an embodiment of the disclosure.

Turning now to FIG. 2, a block diagram 200 describing details of the multi-function AEPH chip 220 is shown. The AEPH chip 114 described above with reference to FIG. 1 may be implemented as the AEPH chip 220. In an embodiment, the AEPH chip 220 comprises a processor 230, a memory 232, and a radio transceiver 234. In an embodiment, the radio transceiver 234 or the AEPH chip 220 comprises two radio transceivers, a first radio transceiver operable to receive and transmit in the first frequency band and a second radio transceiver operable to receive and transmit in the second frequency band. The memory 232 comprises a non-transitory portion that stores a communication application 236, a re-writeable identifier 238, and a generic/unique identifier 240. The communication application 236, executing on the processor 230, creates radio information records 242 about the detection events and stores them in the non-transitory portion of the memory 232.

The AEPH management application 104 may send the generic/unique identities associated with a plurality of AEPH chips 220 to the OEM 110 that manufactures the AEPH chips. The OEM 110 may then install one of the generic/unique identifier 240 into each of the plurality of AEPH chips 220, for example during manufacturing of the AEPH chips 220. The generic/unique identifier 240 of each AEPH chip 220 may be embedded or provisioned into a static memory portion of the AEPH chip 220 that cannot be changed after it is written to the first time by the OEM 110. In an embodiment, the AEPH chip 220 may further comprise the re-writeable identifier 238 that may be embedded into a dynamic memory portion of the AEPH chip 220 that can be written to multiple times. It is understood that the use of the term "dynamic memory" in this context refers to the ability to write to this portion of memory multiple times. Once identified, a group of AEPH chips 220 or a particular AEPH chip 220 may be accessed, modified, or renamed to provide distinct identities to the identified chips by a service provider. As used herein, this "dynamic memory" portion is non-transitory and retains its data content across periods of the AEPH chip 220 being powered off. This process contrasts with the customary AEPH chip manufacturing process where the OEM 110 controls the assignment of identities to AEPH chips.

Figure 3:
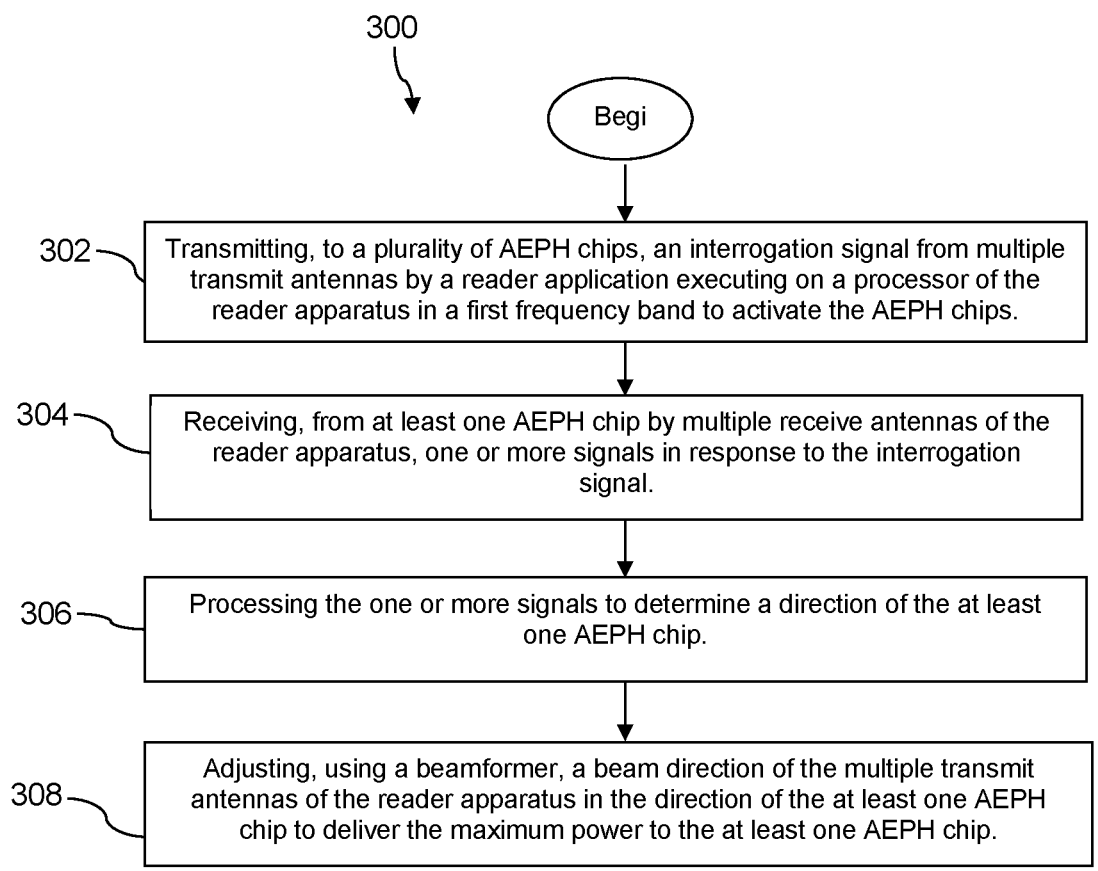
FIG. 3 is a flow chart of a method according to an embodiment of the disclosure.

Turning now to FIG. 3, a method 300 is described. In an embodiment, the method 300 is a method of utilizing beamforming to selectively locate one or more ambient electromagnetic power harvesting (AEPH) chips, implemented by a reader apparatus comprising multiple antennas.

At block 302, the method 300 comprises transmitting, to the AEPH chips, an interrogation signal from multiple transmit antennas by a reader application executing on a processor of the reader apparatus in a first frequency band to activate the AEPH chips. In an embodiment, the first frequency band comprises a 2.496 GHz to 2.502 GHz frequency band. In an embodiment, the first frequency band operates at a frequency of 2.496 GHz. In an embodiment, the AEPH chips receive power from ambient electromagnetic waves emitted in a cellular radio frequency band.

At block 304, the method 300 comprises receiving, from at least one AEPH chip by multiple receive antennas of the reader apparatus, one or more signals in response to the interrogation signal.

At block 306, the method 300 comprises processing the one or more signals to determine a direction of the at least one AEPH chip. In an embodiment, the direction of the AEPH chip is determined relative to a known location of the reader apparatus. In an embodiment, the processing comprises determining a phase shift for the one or more signals; and determining the direction of the at least one AEPH chip based on the phase shift. In an embodiment, the processing comprises monitoring a received signal strength indication (RSSI) value for the at least one AEPH chip to calculate a distance between the reader apparatus and the at least one AEPH chip and to maximize the power to the at least one AEPH chip based on the distance. In an embodiment, the processing comprises determining an angle of arrival of the one or more signals; and determining the direction of the at least one AEPH chip based on the angle of arrival. In an embodiment, the processing comprises determining differences in arrival times at which the one or more signals are received; and determining the direction of the at least one AEPH chip based on the differences in the arrival times.

At block 308, the method 300 comprises adjusting, using a beamformer, a beam direction of the multiple transmit antennas of the reader apparatus in the direction of the at least one AEPH chip to deliver the maximum power to the at least one AEPH chip.

In an embodiment, the method 300 further comprises receiving, from a group of AEPH chips by the multiple receive antennas, the one or more signals in response to the interrogation signal; processing the one or more signals to determine a direction of the group of AEPH chips; and adjusting, using the beamformer, the beam direction of the multiple transmit antennas of the reader apparatus in the direction of the group of AEPH chips to deliver the maximum power to the group of AEPH chips. In an embodiment, the interrogation signal comprises a first unique identifier identifying the at least one AEPH chip or a group of AEPH chips comprising the first unique identifier, wherein the at least one AEPH chip comprises a memory for storing the first unique identifier in a first part of the memory and re-writeable identifier in a second part of the memory, and wherein the re-writeable identifier can be accessed, renamed, or modified by the reader apparatus. In an embodiment, the reader apparatus comprises a handheld device, a static device, or a power transmitter, wherein the at least one AEPH chip is in line-of-sight or out-of-sight with the reader apparatus.

Figure 4:
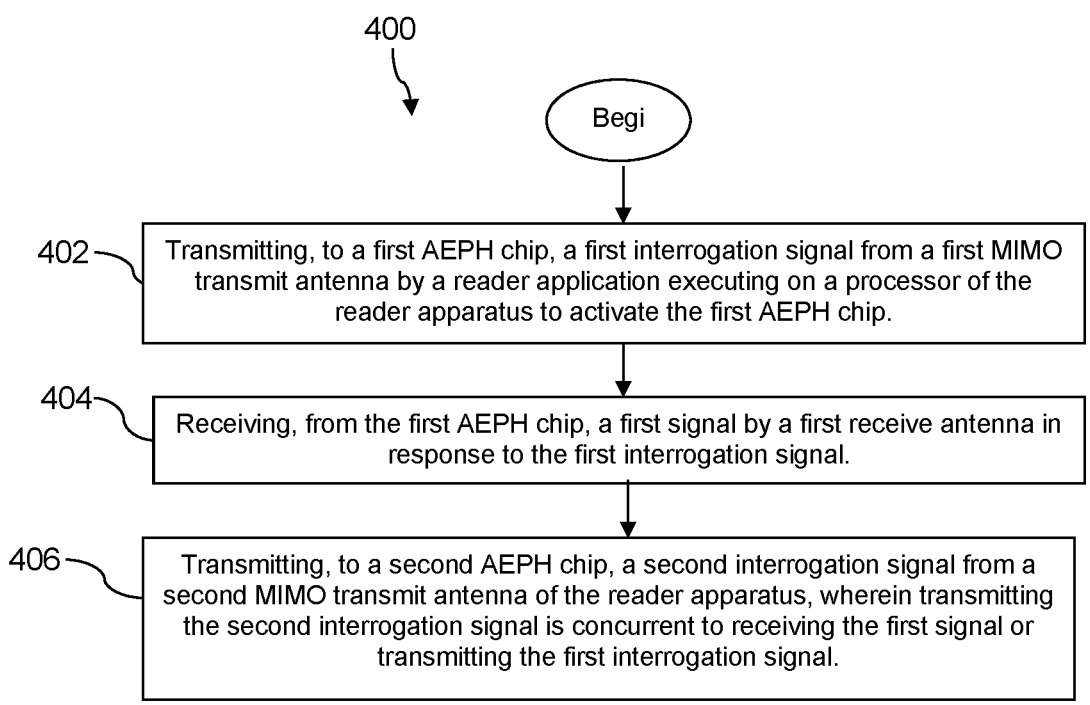
FIG. 4 is a flow chart of another method according to an embodiment of the disclosure.

Turning now to FIG. 4, a method 400 is described. In an embodiment, the method 400 is a method of communicating concurrently with one or more ambient electromagnetic power harvesting (AEPH) chips, implemented by a reader apparatus comprising multiple input multiple output (MIMO) antennas. In an embodiment, the AEPH chips harvest electromagnetic power from a frequency band in the range of 2.4 GHz to 2.6 GHz. In an embodiment, the AEPH chips harvest electromagnetic power from a frequency band in the range of 2.496 GHz to 2.502 GHz. In an embodiment, the AEPH chips harvest electromagnetic power at a frequency of 2.496 GHz.

At block 402, the method 400 comprises transmitting, to a first AEPH chip, a first interrogation signal from a first MIMO transmit antenna by a reader application executing on a processor of the reader apparatus in a first frequency band to activate the first AEPH chip.

At block 404, the method 400 comprises receiving, from the first AEPH chip, a first signal by a first receive antenna in response to the first interrogation signal.

At block 406, the method 400 comprises transmitting, to a second AEPH chip, a second interrogation signal from a second MIMO transmit antenna of the reader apparatus wherein transmitting the second interrogation signal is concurrent to receiving the first signal or transmitting the first interrogation signal.

Figure 5:
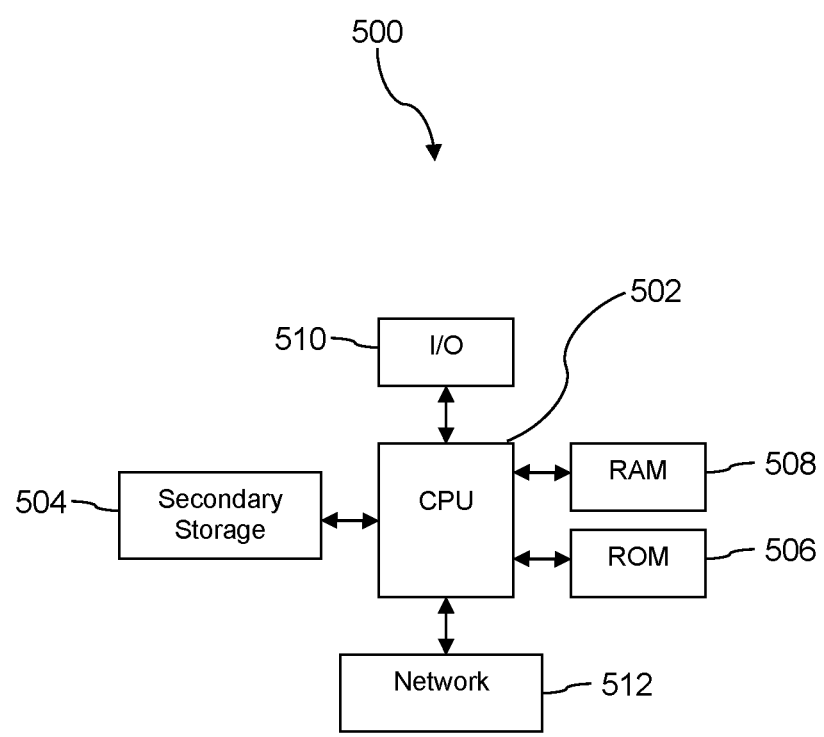
FIG. 5 is a block diagram of a computer system according to an embodiment of the disclosure.

FIG. 5 illustrates a computer system 500 suitable for implementing one or more embodiments disclosed herein. The computer system 500 includes a processor 502 (which may be referred to as a central processor unit or CPU) that is in communication with memory devices including secondary storage 504, read only memory (ROM) 506, random access memory (RAM) 508, input/output (I/O) devices 510, and network connectivity devices 512. The processor 502 may be implemented as one or more CPU chips.

It is understood that by programming and/or loading executable instructions onto the computer system 500, at least one of the CPU 502, the ROM 506, and the RAM 508 are changed, transforming the computer system 500 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 500 is turned on or booted, the CPU 502 may execute a computer program or application. For example, the CPU 502 may execute software or firmware stored in the ROM 506 or stored in the RAM 508. In some cases, on boot and/or when the application is initiated, the CPU 502 may copy the application or portions of the application from the secondary storage 504 to the RAM 508 or to memory space within the CPU 502 itself, and the CPU 502 may then execute instructions that the application is comprised of. In some cases, the CPU 502 may copy the application or portions of the application from memory accessed via the network connectivity devices 512 or via the I/O devices 510 to the RAM 508 or to memory space within the CPU 502, and the CPU 502 may then execute instructions that the application is comprised of. During execution, an application may load instructions into the CPU 502, for example load some of the instructions of the application into a cache of the CPU 502. In some contexts, an application that is executed may be said to configure the CPU 502 to do something, e.g., to configure the CPU 502 to perform the function or functions promoted by the subject application. When the CPU 502 is configured in this way by the application, the CPU 502 becomes a specific purpose computer or a specific purpose machine.

The secondary storage 504 is typically comprised of one or more disk drives or tape drives and is used for non-volatile storage of data and as an over-flow data storage device if RAM 508 is not large enough to hold all working data. Secondary storage 504 may be used to store programs which are loaded into RAM 508 when such programs are selected for execution. The ROM 506 is used to store instructions and perhaps data which are read during program execution. ROM 506 is a non-volatile memory device which typically has a small memory capacity relative to the larger memory capacity of secondary storage 504. The RAM 508 is used to store volatile data and perhaps to store instructions. Access to both ROM 506 and RAM 508 is typically faster than to secondary storage 504. The secondary storage 504, the RAM 508, and/or the ROM 506 may be referred to in some contexts as computer readable storage media and/or non-transitory computer readable media.

I/O devices 510 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 512 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 512 may provide wired communication links and/or wireless communication links (e.g., a first network connectivity device 512 may provide a wired communication link and a second network connectivity device 512 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), Wi-Fi (IEEE 802.11), Bluetooth, Zigbee, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 512 may enable the processor 502 to communicate with the Internet or one or more intranets. With such a network connection, it is contemplated that the processor 502 might receive information from the network, or might output information to the network in the course of performing the above-described method steps. Such information, which is often represented as a sequence of instructions to be executed using processor 502, may be received from and outputted to the network, for example, in the form of a computer data signal embodied in a carrier wave.

Such information, which may include data or instructions to be executed using processor 502 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 502 executes instructions, codes, computer programs, scripts which it accesses from hard disk, floppy disk, optical disk (these various disk based systems may all be considered secondary storage 504), flash drive, ROM 506, RAM 508, or the network connectivity devices 512. While only one processor 502 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 504, for example, hard drives, floppy disks, optical disks, and/or other device, the ROM 506, and/or the RAM 508 may be referred to in some contexts as non-transitory instructions and/or non-transitory information.

In an embodiment, the computer system 500 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 500 to provide the functionality of a number of servers that is not directly bound to the number of computers in the computer system 500. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third-party provider. Some cloud computing environments may comprise cloud computing resources owned and operated by the enterprise as well as cloud computing resources hired and/or leased from a third-party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and another computer usable program code. The computer program product may be embodied in removable computer storage media and/or non-removable computer storage media. The removable computer readable storage medium may comprise, without limitation, a paper tape, a magnetic tape, magnetic disk, an optical disk, a solid-state memory chip, for example analog magnetic tape, compact disk read only memory (CD-ROM) disks, floppy disks, jump drives, digital cards, multimedia cards, and others. The computer program product may be suitable for loading, by the computer system 500, at least portions of the contents of the computer program product to the secondary storage 504, to the ROM 506, to the RAM 508, and/or to other non-volatile memory and volatile memory of the computer system 500. The processor 502 may process the executable instructions and/or data structures in part by directly accessing the computer program product, for example by reading from a CD-ROM disk inserted into a disk drive peripheral of the computer system 500. Alternatively, the processor 502 may process the executable instructions and/or data structures by remotely accessing the computer program product, for example by downloading the executable instructions and/or data structures from a remote server through the network connectivity devices 512. The computer program product may comprise instructions that promote the loading and/or copying of data, data structures, files, and/or executable instructions to the secondary storage 504, to the ROM 506, to the RAM 508, and/or to other non-volatile memory and volatile memory of the computer system 500.

In some contexts, the secondary storage 504, the ROM 506, and the RAM 508 may be referred to as a non-transitory computer readable medium or a computer readable storage media. A dynamic RAM embodiment of the RAM 508, likewise, may be referred to as a non-transitory computer readable medium in that while the dynamic RAM receives electrical power and is operated in accordance with its design, for example during a period of time during which the computer system 500 is turned on and operational, the dynamic RAM stores information that is written to it. Similarly, the processor 502 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of utilizing beamforming to selectively locate one or more ambient electromagnetic power harvesting (AEPH) chips, implemented by a reader apparatus comprising multiple antennas, the method comprising:
    transmitting, to the AEPH chips, an interrogation signal from multiple transmit antennas by a reader application executing on a processor of the reader apparatus in a first frequency band to activate the AEPH chips;
    receiving, from at least one AEPH chip by multiple receive antennas of the reader apparatus, one or more signals in response to the interrogation signal;
    processing the one or more signals to determine a direction of the at least one AEPH chip; and
    adjusting, using a beamformer, directivity of a beam of the multiple transmit antennas of the reader apparatus in the direction of the at least one AEPH chip to deliver the maximum power to the at least one AEPH chip.

2. The method of claim 1, wherein the adjusting comprises adjusting a transmission power parameter of the reader apparatus based on a distance between the at least one AEPH chip and the reader apparatus.

3. The method of claim 1, wherein the processing comprises:
    determining a phase shift for the one or more signals; and
    determining the direction of the at least one AEPH chip based on the phase shift.

4. The method of claim 1, wherein the processing comprises monitoring a received signal strength indication (RSSI) value for the at least one AEPH chip to calculate a distance between the reader apparatus and the at least one AEPH chip and to maximize the power to the at least one AEPH chip based on the distance.

5. The method of claim 1, wherein the processing comprises:
    determining an angle of arrival of the one or more signals; and
    determining the direction of the at least one AEPH chip based on the angle of arrival.

6. The method of claim 1, wherein the processing comprises:
    determining differences in arrival times at which the one or more signals are received; and
    determining the direction of the at least one AEPH chip based on the differences in the arrival times.

7. The method of claim 1, wherein the multiple antennas comprise multiple input multiple output (MIMO) antennas.

8. The method of claim 1, further comprising:
    receiving, from a group of AEPH chips by the multiple receive antennas, the one or more signals in response to the interrogation signal;
    processing the one or more signals to determine a direction of the group of AEPH chips; and
    adjusting, using the beamformer, the beam direction of the multiple transmit antennas of the reader apparatus in the direction of the group of AEPH chips to deliver the maximum power to the group of AEPH chips.

9. The method of claim 1, wherein the first frequency band comprises a 2.496 GHz to 2.502 GHz frequency band.

10. The method of claim 1, wherein the first frequency band operates at a frequency of 2.496 GHZ.

11. The method of claim 1, wherein the AEPH chips receive power from ambient electromagnetic waves.

12. The method of claim 1, wherein the AEPH chips receive power from ambient electromagnetic waves emitted in a cellular radio frequency band.

13. The method of claim 1, wherein the interrogation signal comprises a first unique identifier identifying the at least one AEPH chip or a group of AEPH chips comprising the first unique identifier, and wherein the first unique identifier is established by an original equipment manufacturer (OEM).

14. The method of claim 13, wherein the at least one AEPH chip comprises a memory for storing the first unique identifier in a first part of the memory and re-writeable identifier in a second part of the memory.

15. The method of claim 14, wherein the re-writeable identifier can be accessed, renamed, or modified by the reader apparatus.

16. The method of claim 1, wherein the reader apparatus comprises a handheld device, a static device, or a power transmitter.

17. The method of claim 1, wherein the at least one AEPH chip is in line-of-sight or out-of-sight with the reader apparatus.

18. A reader apparatus, comprising:
    a processor;
        a non-transitory memory;
        a plurality of multiple input multiple output (MIMO) antennas coupled to the processor;
    a beamformer; and
        a reader application stored in the non-transitory memory that, when executed by the processor:
        transmits, to one or more ambient electromagnetic power harvesting (AEPH) chips, an interrogation signal from multiple transmit MIMO antennas in a first frequency band to activate the AEPH chips;
        receives, from at least one AEPH chip by multiple receive MIMO antennas, one or more signals in response to the interrogation signal;
        processes the one or more signals to determine a direction of the at least one AEPH chip; and
        adjusts, using the beamformer, directivity of a beam of the multiple transmit antennas of the reader apparatus in the direction of the at least one AEPH chip to deliver the maximum power to the at least one AEPH chip.

19. The reader apparatus of claim 18, wherein the reader application, when executed by the processor, further transmits, to a second AEPH chip, a second interrogation signal from a second MIMO transmit antenna of the reader apparatus, wherein transmitting the second interrogation signal is concurrent to receiving the one or more signals or transmitting the interrogation signal.

20. The reader apparatus of claim 19, wherein the first frequency band comprises a 2.496 GHz to 2.502 GHz frequency band.

* * * * *